United States Patent
Mørch et al.

(10) Patent No.: US 8,365,904 B2
(45) Date of Patent: Feb. 5, 2013

(54) DEVICE FOR CONVEYING STICKS IN AN APPARATUS FOR INSERTING STICKS INTO ICE CREAM BODIES

(75) Inventors: Ole Christian Mørch, Svendborg (DK); Jørgen Juel Hagemeister, Herlev (DK)

(73) Assignee: Gram Equipment A/S, Vojens (DK)

( * ) Notice: Subject to any disclaimer, the term of this patent is extended or adjusted under 35 U.S.C. 154(b) by 69 days.

(21) Appl. No.: 11/665,786

(22) PCT Filed: Oct. 21, 2005

(86) PCT No.: PCT/DK2005/000682
§ 371 (c)(1),
(2), (4) Date: Sep. 4, 2007

(87) PCT Pub. No.: WO2006/042556
PCT Pub. Date: Apr. 27, 2006

(65) Prior Publication Data
US 2008/0121496 A1 May 29, 2008

Related U.S. Application Data

(60) Provisional application No. 60/642,802, filed on Jan. 11, 2005.

(30) Foreign Application Priority Data

Oct. 21, 2004 (DK) .................................. 2004 01611

(51) Int. Cl.
*B65G 13/02* (2006.01)
(52) U.S. Cl. .................................... 198/803.14; 198/547
(58) Field of Classification Search ............ 198/803.14, 198/539, 549, 540, 730, 725, 728, 468.11, 198/397.01, 469.1, 473.1, 523, 793, 529, 198/443, 550.1, 550.01, 562, 699.1, 713, 198/717, 734, 867.11; 414/797.4, 797.6, 414/797.9
See application file for complete search history.

(56) References Cited

U.S. PATENT DOCUMENTS

| | | | | | |
|---|---|---|---|---|---|
| 1,676,639 | A | * | 7/1928 | Elliot et al. | 198/463.4 |
| 1,740,607 | A | * | 12/1929 | Leary | 198/793 |
| 2,243,199 | A | * | 5/1941 | Evans | 493/319 |
| 2,322,747 | A | * | 6/1943 | Shand | 131/88 |

(Continued)

FOREIGN PATENT DOCUMENTS

| GB | 600233 | 2/1948 |
|---|---|---|
| GB | 909650 | 10/1962 |

(Continued)

*Primary Examiner* — Gene Crawford
*Assistant Examiner* — William R Harp
(74) *Attorney, Agent, or Firm* — James Creighton Wray

(57) ABSTRACT

A device is described for conveying sticks in an apparatus for inserting sticks into ice cream bodies, said device comprising guide means in which the sticks are supplied in the form of an elongate stack of sticks, and from which guide means the sticks are destacked singly, said device further comprising a conveying belt, said destacked sticks being deposited in a pocket on said conveying belt moving past the exit aperture of the guide means, said conveying belt comprising a plurality of pockets, wherein each pocket has a longitudinal surface for housing a part of one stick, and each pocket furthermore has at least two guide pins projecting upwards on each side of said longitudinal surface. Hereby the sticks are handled without problems, even at high rates of destacking and conveying, and even if the sticks are skewed or in other manner deviate from a standard stick having dimensions and shape in common with at least the majority of the sticks in a given stack.

14 Claims, 1 Drawing Sheet

U.S. PATENT DOCUMENTS

| | | | |
|---|---|---|---|
| 2,348,400 A * | 5/1944 | Manspeaker | 221/224 |
| 2,394,795 A * | 2/1946 | Manspeaker | 198/469.1 |
| 2,439,040 A * | 4/1948 | Cohen | 198/731 |
| 2,632,561 A * | 3/1953 | Sandberg | 198/495 |
| 2,780,342 A * | 2/1957 | Good | 198/732 |
| 3,027,021 A * | 3/1962 | Kramer | 414/788.8 |
| 3,344,954 A | 10/1967 | Peppler et al. | |
| 3,363,544 A * | 1/1968 | Eriksen | 99/426 |
| 4,105,384 A | 8/1978 | Morch | |
| 4,560,058 A * | 12/1985 | Enochs et al. | 198/426 |
| 4,648,772 A * | 3/1987 | Hartlage | 414/796.1 |
| 5,370,495 A * | 12/1994 | Montalvo et al. | 414/797.9 |
| 6,189,678 B1 * | 2/2001 | Loewenthal et al. | 198/418.3 |
| 6,626,633 B2 * | 9/2003 | Jendzurski et al. | 414/797.9 |
| 6,799,938 B2 * | 10/2004 | Sperger | 414/797.4 |

FOREIGN PATENT DOCUMENTS

| | | |
|---|---|---|
| WO | WO 98/18341 | 5/1998 |

* cited by examiner

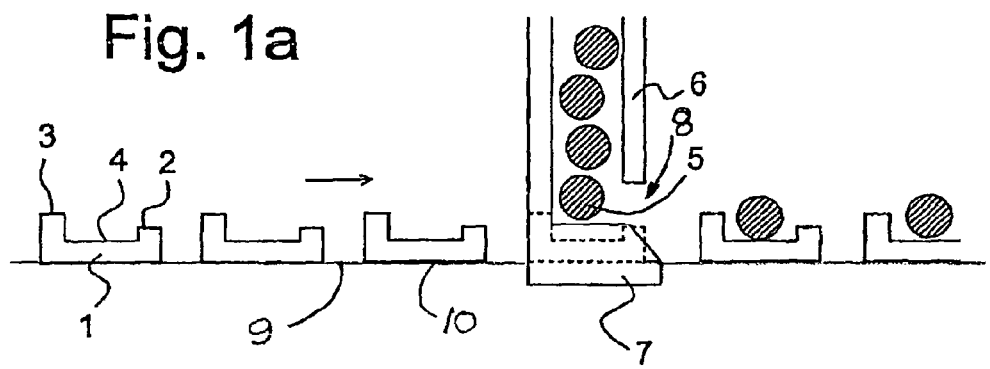
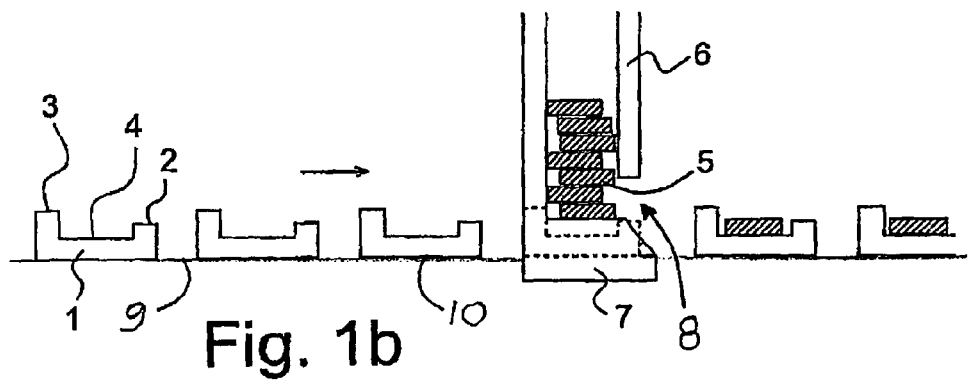
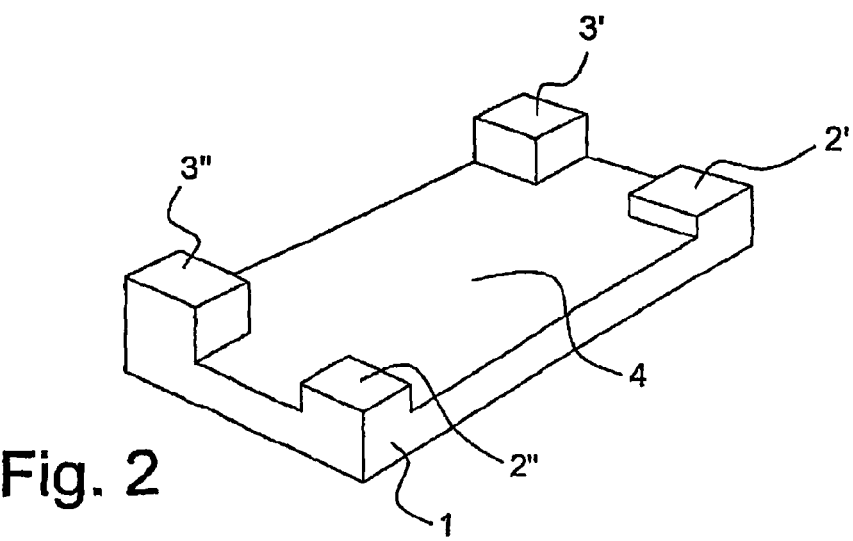

DEVICE FOR CONVEYING STICKS IN AN APPARATUS FOR INSERTING STICKS INTO ICE CREAM BODIES

This application claims the benefit of Danish Application No. 2004 01611 filed Oct. 21, 2004, U.S. Provisional Application Ser. No. 60/642,802 filed Jan. 11, 2005, and PCT/DK2005/000682 filed Oct. 21, 2005, which are hereby incorporated by reference in their entirety.

The present invention relates to a device for conveying sticks in an apparatus for inserting sticks into ice cream bodies, as well as to a conveying belt for use in the device.

BACKGROUND

Danish Patent Application No. 1832/86 discloses an apparatus of the kind referred to above. The apparatus according to Danish Patent Application No. 1832/86 is intended to be able to function even with deformed sticks. Experience has shown, however, that when using high rates of delivery of sticks, occurring in i.a. intermittent operation, high demands are placed on the construction of the carrier, in this case constituting a belt with pockets, into which the sticks are to be pressed singly from the stack of sticks. Thus, the sticks are to be pushed directly into the pockets under the action of a force applied through the stack. For this reason, this force will be continuously exerted against the belt, causing wear of the latter. As it is also necessary for the pockets formed in the belt to have a depth not exceeding the thickness of a stick in order to be able to destack one stick at a time, problems may arise in making the pockets hold sticks that are not quite straight.

SUMMARY OF THE INVENTION

The present invention relates to a device in which the sticks are handled without problems, even at high rates of destacking and conveying, and even if the sticks are skewed or in other manner deviate from a standard stick having dimensions and shape in common with at least the majority of the sticks in a given stack.

Furthermore, it is an object to simplify the construction of a device of the kind referred to, in which the requirements to the components are less critical, and hence that the construction is simpler and more durable and reliable.

Accordingly, in one aspect the invention relates to a device for conveying sticks in an apparatus for inserting sticks into ice cream bodies, said device comprising guide means having an exit aperture, in which guide means the sticks are supplied in the form of an elongated stack of sticks, and from which guide means the sticks are destacked singly when contacted by a pocket attached to a conveying belt, said device further comprising said conveying belt, said destacked sticks being deposited in a pocket on said conveying belt when the pocket is moving past the exit aperture of the guide means, said conveying belt comprising a plurality of pockets, wherein each pocket has a longitudinal surface for housing a part of one stick, and each pocket furthermore has at least two guide pins projecting upwards on each side of said longitudinal surface.

In another aspect the invention relates to the conveying belt as such, namely, a conveying belt for conveying sticks in an apparatus for inserting sticks into ice cream bodies and of the kind in which the sticks are supplied in the form of an elongated stack of sticks in guide means, from which the sticks are destacked singly and deposited in a pocket on the conveying belt moving past the exit aperture of the guide means, said conveying belt comprising a plurality of pockets, wherein each pocket has a longitudinal surface for housing a part of one stick, and each pocket furthermore has at least two guide pins projecting upwards on each side of said longitudinal surface.

DRAWINGS

FIG. 1a shows in a schematic view pockets passing the exit of a guide means of the device according to the invention, wherein the sticks have a circular cross-section.

FIG. 1b shows in a schematic view pockets passing the exit of a guide means of the device according to the invention, wherein the sticks have a rectangular cross-section.

FIG. 2 shows a pocket detached from a conveying belt according to the invention. The front guide pins of said pocket are lower than the back guide pins.

DETAILED DESCRIPTION OF THE INVENTION

The present invention provides a simple, durable and reliable solution to the problem of conveying sticks to be inserted into ice cream bodies, even if the sticks vary in form, such as skewed or bent sticks deviating from normal sticks having an even, non-bent form.

The problem of prior art, i.e. that curved and skewed sticks could not fit into their pockets, leads to empty pockets on the conveying belt. This would subsequently lead to some ice cream bodies not being provided with a stick, and thereby not being lifted out of their mould. The ultimate consequence of empty pockets on the conveying belt is that the ice cream moulds may be emptied manually which of course leads to a stop in the ice cream line and delays.

In accordance with the invention the device comprises guide means in which the sticks are supplied in the form of an elongated stack of sticks, and from which guide means the sticks are destacked singly. The guide means may be of any form and construction, such as guide means shown in WO 96/22697 wherein the guide means positions sticks transported from a feed bin to a feed chain and further into the guide means. The guide means are arranged above the conveying belt, and the sticks are transferred from the exit aperture of the guide means and into the pocket on the conveying belt.

The pockets are arranged on a conveying belt, so that destacked sticks exiting the device guide means may be deposited in the pocket passing under the exit aperture of the guide means.

Each pocket is constructed as follows: Each pocket has a longitudinal (i.e. elongated) surface for housing at least a part of a stick. The length of the longitudinal surface preferably corresponds to at least a fifth of the length of the stick to be deposited in the pocket, more preferable at least a fourth of the length of the stick to be deposited in the pocket, more preferable at least a half of the length of the stick to be deposited in the pocket. The longitudinal surface is preferably a plane supporting surface.

On each side the longitudinal surface is flanked by at least two guide pins, said guide pins being arranged to position the stick along the axis of the longitudinal surface. The guide pins are denoted front guide pins, i.e. the guide pins being in the front in the moving direction of the conveying belt, and back guide pins (the opposite guide pins). The back guide pins are designed to effect the destacking of one stick from the exit aperture of the guide means, and transferring the stick in the pocket.

The guide pins can be positioned in the four corners of a pocket, but need not be so. The only requirement is that at least some of the back guide pins allow sticks from a stack of sticks to be singly detached therefrom when the stick at the bottom of the stack is contacted by one or more back guide pins on the pocket preferably projecting along an axis perpendicularly, or essentially perpendicularly, to the elongated base surface of a pocket. By essentially perpendicularly is meant an axial direction having an angle in the range of from 70 to 110 degrees relative to the base surface of the pocket, such as from 80 to 100 degrees, for example from 85 to 95 degrees.

Accordingly, the guide pins can project upwards on each side of said longitudinal surface. By the term upwards is meant the direction from the pocket to the exit aperture of the guide means, and the guide means being arranged above the conveying belt. The guide pins can be straight or curved. Accordingly, the top part of e.g. the back guide pin(s) may extend or curve partially towards the front guide pins (i.e. in the direction of movement of the pocket), thereby creating a groove for the stick to fall into when the stick is detached from the stack of sticks.

The pocket is capable of accommodating sticks of various forms, including skewed sticks, since the pocket is not flanked by solid bars, but only flanked by a few pins allowing a curved stick to lie on the longitudinal surface, because the curve of the stick may protrude into the space between two guide pins. The guide pins are preferably located along each end of the longitudinal surface, as shown in FIG. 2, thereby allowing for a number of various forms of sticks to lie on the longitudinal surface.

The guide pins may be of any suitable form. In one embodiment, the guide pins are formed as cylinders. In another embodiment the guide pins are formed as blocks. The upper edge of the guide pins may be cut horizontally or, in a preferred embodiment, the upper edge is inclined, and the higher part being towards the longitudinal surface.

It is important that the height of the back guide pins match the thickness and shape of the sticks so that the height allows for the stick to be singly detached from the stack of sticks positioned in the device guide means—taking into account that bent or skewed sticks must also be able to be singly detached from the stack of sticks.

In one embodiment it is preferred that the height of the back guide pins is equal to or higher than the height of the stick, when the stick is arranged in the pocket. By the term height of the stick is meant the vertical dimension of the stick when the stick is positioned in the pocket.

It is furthermore preferred that the height of the front guide pins, in the direction of the conveying belt, is lower than the height of the back guide pins. Thereby the front guide pins may be allowed to pass under the stick, allowing the stick to be positioned on the longitudinal surface and the back guide pins may then effect that the stick is transported from the exit aperture of the guide means in the direction of the conveying belt.

In particular when the height of the back guide pins is higher than the vertical height of the stick it is preferred to provide a lower guide plate for receiving and housing a stick until the stick is arranged in a pocket. Accordingly, in one embodiment at least one lower guide plate is arranged below the guide means in order to receive one stick from the guide means, and arranged to deliver said one stick to a pocket passing the exit of the guide means. The lower guide plate is in one embodiment two surfaces, one on each side of the conveying belt. The stick falls from the exit aperture onto the lower guide plate and rests thereon until the next pocket enters between the two surfaces. The stick is then carried from the lower guide plate with the pocket due to the back guide pins.

Once the pocket has been conveyed from the area below the exit aperture, the next stick falls onto the lower guide plate ready for the next pocket to pass.

It is preferred that the lower guide plate(s) is arranged at a higher vertical level than the longitudinal surface of the pocket. Thereby, the stick in the bottom of the stack, i.e. the next or first stick to be captured by the back guide pins of a pocket passing the exit aperture of the guide means of the device keeping the stack of sticks in place, rests on the lower guide plate of the device guide means at a height—relative to the pockets attached to the conveying belt—which is higher than the front guide pins of the pockets (so that the front guide pins will pass underneath the stick when a pocket initially enters the device guide means) while still allowing the (higher) back guide pins to make contact with the stick, thereby detaching the stick from the stack and placing the stick in the pocket on the conveying belt when the pocket exits the device guide means through the exit aperture of the device guide means.

The sticks may be pressed into the pockets through the use of a suitable pressing force, such as a spring, or merely forced due to gravity. In a preferred embodiment the sticks are falling due to gravity.

The conveying belt according to the invention may be constructed from any suitable material, such as a chain belt or a belt made from a soft material, for example a plastic material.

As discussed above the conveying belt is provided with a plurality of pockets. The pockets may be integrated with the belt, or attached to the belt. The latter embodiment is preferred since it facilitates rearrangements of the pockets, if for example the distance between the pockets should be adjusted. The pockets may be attached to the conveying belt through any suitable attachment means. The pockets are preferably releasably attached to the conveying belt.

The pockets may be spaced apart regularly within the same group or section of pockets on the conveying belt, the distance between two pockets preferably corresponding to the distance between insertion means arranged for inserting the sticks into ice cream bodies. In a preferred embodiment the conveying belt has the form of an endless belt, whereby the circumference of the conveying belt is adjusted so that a suitable amount of pockets may be arranged on the belt.

Evenly spaced apart pockets within the same section or group of pockets on the conveying belt can be separated from one or more additional groups or sections of pockets on the same conveying belt. A group or section of evenly spaced apart pockets can contain from 6 or less to 50 or more pockets, such as from 8 to about 40 pockets, for example from 8 to about 30 pockets. Each conveying belt can contain one or more groups or sections of evenly spaced apart pockets, such as 1 group or section, for example 2 groups or sections of evenly spaced apart pockets, such as 3 groups or sections of evenly spaced apart pockets, for example 4 or 5 groups or sections of evenly spaced apart pockets, for example 6 or 7 groups or sections of evenly spaced apart pockets. The individual design of the conveying belt can be adapted according to the needs of an ice cream producer having a certain line of ice cream manufacturing equipment installed in his production facility.

The pockets may be constructed from any suitable material, it is however preferred that the pockets, or at least the part of the pocket facing the stick is made from metal or metal alloy, said metal and metal alloy being suitable for contact to foods.

It is preferred that the construction of the guide means secures that sticks leaving the exit aperture, only falls down orientated in the direction of the longitudinal surface of the pocket. Thus, in one embodiment an upper guide plate is arranged on the guide means, so that the distance between said upper guide plate and the lower guide plate is above the height of one stick, and below the height of two sticks. Thereby one stick is allowed to pass under the upper guide plate with the pocket; however, two sticks cannot be transferred by one pocket.

In yet another aspect the invention relates to a conveying belt as described above for conveying sticks in an apparatus for inserting sticks into ice cream bodies.

The sticks arranged in the pocket may then be inserted into the ice cream bodies through any suitable means. In one embodiment the conveying belt is constructed to stop at regular intervals, whereby inserting means grip the sticks from the pockets and insert the sticks into the ice cream bodies, upon which the conveying belt moves again allowing pockets to be filled with sticks, before the next stop allows the inserting means to grip the sticks.

The invention furthermore, relates to a method for conveying sticks in an apparatus for inserting sticks into ice cream bodies, said method comprising arranging sticks into a guide means in which the sticks are supplied in the form of an elongate stack of sticks, and destacking from said guide means the sticks singly, arranging a stick in a pocket on a conveying belt, said conveying belt moving past the exit aperture of the guide means, and said conveying belt comprising a plurality of pockets, wherein each pocket has a longitudinal surface for housing a part of one stick, and each pocket furthermore has at least two guide pins projecting upwards on each side of said longitudinal surface as described above.

Reference Signs in the Drawings:
1 pocket
2 front guide pin
3 back guide pin
4 longitudinal surface
5 stick
6 upper guide plate
7 lower guide plate
8 exit aperture
9 conveying belt
10 attachments
arrow—the moving direction of the conveying belt

The invention claimed is:

1. Apparatus comprising a device for conveying sticks for inserting into ice cream bodies, said device comprising guide means in which the sticks are supplied in the form of an elongate stack of sticks, and from which guide means the sticks are destacked singly, the guide means further comprising a vertical front plate, a horizontal guide plate wherein the stack of sticks rests directly on the horizontal guide plate and is fully supported thereby and an exit aperture between a lower edge of the front plate and the guide plate, the exit aperture having a height at least as great as a thickness of one stick and less than combined thicknesses of two sticks, said device further comprising an endless conveying belt, said conveying belt comprising a plurality of attachments having pockets, wherein each attachment pocket has a longitudinal surface forming a plane supporting surface generally perpendicular to the guide means and parallel to a direction of conveyance and having a leading edge and a trailing edge for housing a part of one stick, wherein the stick rests directly on the plane supporting surface and is fully supported thereby, and each attachment pocket furthermore has at least two guide pins projecting upwards on each side of said longitudinal surface, wherein the at least two guide pins are on opposite sides of the longitudinal surface and generally parallel to one another with front guide pins disposed along the leading edge and back guide pins disposed along the trailing edge spaced from one another defining the attachment pocket therebetween for receiving the one stick, wherein the guide pins on at least one side of the longitudinal surface are arranged along each end of the longitudinal surface of the attachment pocket, wherein the height of the front guide pins, in the direction of the conveying belt, is lower than the height of the back guide pins and tops of the back pins are spaced a distance from the conveying belt between the guide plate and the lower edge of the front plate, wherein the attachment pockets are not flanked by solid bars, said destacked sticks being deposited in a pocket on an attachment on said conveying belt as the attachment is moving past the exit aperture of the guide means.

2. The device according to claim 1, wherein the guide pins on both sides of the longitudinal surface are arranged along each end of the longitudinal surface of the attachment pocket.

3. The device according to claim 1, wherein the height of the back guide pins, in the direction of the conveying belt, is equal to or higher than the height of the stick, when the stick is arranged in the attachment pocket.

4. The device according to claim 1, wherein the pockets are attached to the conveying belt through attachments.

5. The device according to claim 1, wherein the pockets are spaced apart on the conveying belt.

6. The device according to claim 1, wherein an upper guide plate is attached to the vertical front plate of the guide means thereby adjusting the size of the aperture.

7. Apparatus comprising a conveying belt for conveying sticks for inserting into ice cream bodies, in which the sticks are supplied in the form of an elongate stack of sticks in guide means, said stack being fully supported by a horizontally planar portion of the guide means, from which the sticks are destacked singly and deposited in a pocket on an attachment on the conveying belt as the attachment is moving past an exit aperture of the guide means, said conveying belt comprising a plurality of attachment pockets, wherein each attachment pocket has a longitudinal surface forming a plane supporting surface generally perpendicular to the stack and parallel to a direction of conveyance of the conveying belt and each attachment pocket having a leading edge and a trailing edge for housing a part of one stick, and each attachment pocket furthermore has at least two guide pins projecting upwards on each side of said longitudinal surface, wherein the at least two guide pins are on opposite sides of the longitudinal surface and generally parallel to one another with front guide pins disposed along the leading edge and back guide pins disposed along the trailing edge spaced from one another defining a pocket therebetween for receiving the one stick, wherein the guide pins on at least one side of the longitudinal surface are arranged along each end of the longitudinal surface of the attachment pocket, wherein the stick rests directly on the longitudinal surface and is fully supported thereby, wherein the height of the back guide pins, in the direction of the conveying belt, are taller than the front pins, wherein the attachment pockets are not flanked by solid bars.

8. The conveying belt according to claim 7, wherein the guide pins on both sides of the longitudinal surface are arranged along each end of the longitudinal surface of the pocket.

9. The conveying belt according to claim 7, wherein the pockets are attached to the conveying belt through attachments.

10. The conveying belt according to claim 7, wherein the pockets are spaced apart on the conveying belt.

11. The conveying belt according to claim 7, wherein the conveying belt has the form of an endless belt.

12. Apparatus comprising an endless conveyor belt,
a group of evenly spaced rectangular flat raised attachments connected to the belt and having rectangular carrying surfaces parallel to and spaced from the belt, each rectangular flat raised attachment having two forward corners and two rearward corners,
guide pins perpendicularly attached to the corners and extending perpendicularly outward from the corners,
the guide pins extending perpendicularly from the rearward corners being taller than the guide pins extending outward from the surfaces at the forward corners, wherein the rectangular carrying surfaces are not flanked by solid bars,
wherein the rectangular carrying surfaces are sufficiently flat to fully support a stick of the kind used to hold ice cream desserts.

13. The apparatus of claim 12, further comprising a vertical guide above the conveyor belt for a vertical stack of horizontal sticks, a front plate on the vertical guide, a lower horizontal guide plate on the vertical guide, an exit aperture,
the exit aperture being a space between a lower edge of the front plate and the lower horizontal guide plate,
the exit aperture having a height above the lower plate at least as great as a thickness of one stick, and the less than combined thicknesses of two sticks,
the horizontal guide plate being spaced from the conveyor belt less than a height above the conveyor belt of the guide pins extending outward from the rearward corners of the attachment, wherein the horizontal guide plate is flat and fully supports the vertical stack of sticks.

14. The apparatus of claim 12, wherein the guide pins are rectangular blocks.

* * * * *